United States Patent
Julian

(10) Patent No.: US 8,977,308 B2
(45) Date of Patent: Mar. 10, 2015

(54) DELAYED RESPONSE TO AN ACCESS PROBE

(75) Inventor: David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 11/361,077

(22) Filed: Feb. 22, 2006

(65) Prior Publication Data

US 2007/0197246 A1 Aug. 23, 2007

(51) Int. Cl.
*H04B 7/00* (2006.01)
*H04W 48/20* (2009.01)

(52) U.S. Cl.
CPC ................... *H04W 48/20* (2013.01)
USPC .......... 455/507; 455/41.2; 455/502; 455/512; 455/513; 455/524; 370/318; 370/445; 370/446; 370/447; 370/448; 709/223; 709/224; 709/225; 709/226; 709/229

(58) Field of Classification Search
USPC ........ 455/41.2, 502, 507, 512, 513, 524, 525, 455/88, 561, 452.2, 453, 522, 69–70, 63.1, 455/67.11; 370/318, 445–448, 338; 709/223–226, 229
See application file for complete search history.

(56) References Cited

U.S. PATENT DOCUMENTS

| | | |
|---|---|---|
| 2003/0134642 A1 | 7/2003 | Kostic et al. |
| 2004/0156399 A1* | 8/2004 | Eran ............................ 370/913 |
| 2005/0059353 A1* | 3/2005 | Smith et al. ................. 455/67.11 |
| 2006/0046661 A1* | 3/2006 | Ekvetchavit et al. ....... 455/67.11 |
| 2006/0062240 A1* | 3/2006 | Meier ........................... 370/448 |
| 2006/0126580 A1* | 6/2006 | Katsumata et al. ........... 370/338 |
| 2006/0223443 A1* | 10/2006 | Reudink .................... 455/67.11 |
| 2006/0234756 A1* | 10/2006 | Yamasaki et al. ............. 455/525 |
| 2007/0072563 A1* | 3/2007 | Weaver ..................... 455/115.1 |
| 2010/0265818 A1* | 10/2010 | Chen et al. .................... 370/217 |

FOREIGN PATENT DOCUMENTS

| | | |
|---|---|---|
| EP | 1463242 A2 | 9/2004 |
| TW | 300943 | 3/1997 |

(Continued)

OTHER PUBLICATIONS

"Wireless LAN Medium Access Control (MAC) and Physical Layer (PHY) specifications," IEEE Standard Part 11, Information technology—Telecommunications and information exchange between systems—Local and metropolitan area networks—Specific requirement. ISO/IEC 8802-11, ANSI/IEE Std. 802.11, Aug. 20, 1999, pp. 123-137.

(Continued)

*Primary Examiner* — Fayyaz Alam
(74) *Attorney, Agent, or Firm* — Nicholas J. Pauley; Peter Michael Kamarchik; Joseph Agusta

(57) ABSTRACT

Apparatuses and methodologies are described that mitigate signal pollution in a wireless communication system. According to one aspect, user devices can request signals for use in access point selection. Access points can be selected based upon the received strength of their signals. In one aspect, access points can delay the transmission of signals based upon the strength of the received request. In addition, if sufficient access points respond during the delay, an access point can refrain from transmitting signals in response to signal requests, further reducing signal pollution.

19 Claims, 12 Drawing Sheets

(56) References Cited

FOREIGN PATENT DOCUMENTS

| WO | 03/105356 A1 | 12/2003 |
| WO | WO2004068739 A1 | 8/2004 |
| WO | 2005006785 A2 | 1/2005 |

OTHER PUBLICATIONS

International Search Report and Written Opinion—PCT/US2007/062623, International Search Authority—European Patent Office—Jul. 17, 2007.

Taiwan Search Report—TW096106548—TIPO—Jun. 16, 2011.

* cited by examiner

DELAYED RESPONSE TO AN ACCESS PROBE

BACKGROUND

I. Field

The following description relates generally to wireless communications, and, amongst other things, to the selection of access points in wireless communication systems.

II. Background

Wireless networking systems have become a prevalent means by which a majority of people worldwide has come to communicate. Wireless communication devices have become smaller and more powerful in order to meet consumer needs and to improve portability and convenience. Consumers have found many uses for wireless communication devices such as cellular telephones, personal digital assistants (PDAs) and the like, demanding reliable service and expanded areas of coverage.

A typical wireless communication network (e.g., employing frequency, time, and code division techniques) includes one or more access points that provide a coverage area and one or more mobile (e.g., wireless) user devices that can transmit and receive data within the coverage area. A typical access point can simultaneously transmit multiple data streams for broadcast, multicast, and/or unicast services, wherein a data stream is a stream of data that can be of independent reception interest to a user device. A user device within the coverage area of that access point can be interested in receiving one, more than one or all the data streams carried by the composite stream. Likewise, a user device can transmit data to the access point or another user device. Such communication between an access point and user device or between user devices can be degraded due to channel variations and/or interference power variations. For example, the aforementioned variations can affect access point scheduling, power control and/or rate prediction for one or more user devices.

Prior to communicating, a user device can be assigned to a particular access point. In general, a user device should be assigned to the access point from which the user device will receive the strongest signal. In addition, the method for assigning mobile devices to access points should not generate excessive overhead or disrupt system performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection selecting suitable access points for communication in a wireless system. According to one aspect, a user device transmits a request for a signal to access points. A suitable access point for the user device can be determined based upon the signals received in response to the signal request. In addition, the access points can delay or cancel the transmission of signals in response to the signal request to further reduce signal pollution.

In an aspect, a method for identifying suitable access points for a wireless communication environment can comprise receiving a request for a signal for use in access point selection and transmitting a signal in response to the signal request. In addition, the method can include generating a delay for transmitting the signal, where the delay is a function of the received strength of the signal request. The method can also include storing a set of delay values that correspond to various signal strengths and retrieving a delay value from the set of delay values based at least in part upon the strength of the signal request. Moreover, the method can include determining if there has been a response by a plurality of access points prior to transmission of the signal and refraining from transmitting the signal if more than a predetermined number of the plurality of other access points have responded to the signal request.

According to another aspect, a method for facilitating identification of suitable access points can comprise transmitting a signal request, receiving at least one signal in response to the signal request and selecting an access point based upon the received signal. Selection of the access point can be based at least in part upon received signal strength of the at least one signal or on the time at which the at least one signal was received.

According to yet another aspect, an apparatus that facilitates identifying suitable access points for wireless communication can comprise a processor configured to receive a request for a signal for use in access point selection and send a signal triggered by the signal request. The processor can be configured to generate a back-off period that is based at least in part upon of the received strength of the signal request. In addition, the apparatus can comprise a memory coupled to the processor, where the memory stores a set of back-off period values that correspond to various signal strengths. Moreover, the processor can be configured to determine if there has been a response by a predetermined number of access points during the back-off period and to cancel the transmission of the signal if the predetermined number of access points have responded.

According to another aspect, an apparatus for identifying suitable access points can comprise a processor configured to send a signal request, receive at least one signal in response to the signal request and identify an access point based at least in part upon the at least one signal. The processor can be configured to identify an access point based at least in part upon received signal strength of the at least one signal or order in which the at least one signal was received. The order in which the processor receives the signals is based at least in part on the received strength of the signal request at access points.

According to another aspect, an apparatus for facilitating identification of access points for a wireless communication environment can comprise means for receiving a request for a signal for use in access point selection and means for transmitting a signal in response to the signal request. Additionally, the apparatus can comprise means for generating a delay for transmitting the signal, where the delay is a function of the received strength of the signal request. The apparatus can further comprise means for storing a set of delay values that correspond to various signal strengths and means for retrieving a delay value from the set of delay values based at least in part upon the received strength of the signal request. In addition, the apparatus can comprise means for determining if there has been a response by at least one other access point prior to transmission of the signal and means for canceling transmission of the signal based upon the number of access points that have responded to the signal request.

According to another aspect, an apparatus for facilitating identification of access points for a wireless communication environment can comprise means for sending a signal request, means for receiving at least one signal in response to the signal request and means for identifying an access point based at least in part upon received signal. Identification of access points can be based at least in part upon received signal strength of the at least one signal or time at which the at least one signal was received.

Yet another aspect relates to a computer-readable medium having stored thereon computer-executable instructions for receiving a request for a signal for use in access point selection and transmitting a signal in response to the signal request. The computer-readable medium can also have stored thereon instructions for generating a delay for sending the signal, where the delay is a function of the received strength of the signal request. Additionally, the computer-readable medium can have stored thereon instructions for storing a set of delay values that correspond to various signal strength levels and retrieving a delay value from the set of delay values based at least in part upon the strength of the signal request. In addition, the computer-readable medium can have stored thereon instructions for determining if there has been a response by at least one other access point prior to transmission of the signal and refraining from transmitting the signal if a predetermined number of the at least one other access points have responded to the signal request.

Another aspect relates to a computer-readable medium having stored thereon computer-executable instructions for sending a signal request, receiving at least one signal in response to the signal request and selecting an access point based upon the received signal. The computer-readable medium can also have instructions for selecting an access point based at least in part upon received signal strength of the at least one signal or the time at which the at least one signal was received.

Yet another aspect relates to a processor that executes instructions for identifying access points for a wireless communication environment, the instructions can comprise receiving a request for a signal for use in access point selection and transmitting a signal in response to the signal request. The instructions can also comprise generating a delay for sending the signal, where the delay is a function of the radio frequency path loss of the signal request. Additionally, the instructions can comprise determining if there has been a response by at least one other access point during the delay and refraining from transmitting the signal if a predetermined number of the at least one other access points have responded to the signal request during the delay.

Yet another aspect relates to a processor that executes instructions for identifying access points for a wireless communication environment, the instructions can comprise sending a signal request, receiving at least one signal in response to the signal request and selecting an access point based at least in part on the received signal. The instructions can further comprise selecting an access point based at least in part upon radio frequency path loss of the at least one signal or time at which the at least one signal was received.

A further aspect sets forth a mobile device that can comprise a component that receives a signal request and a component that transmits a signal in response to the signal request. The mobile device can further comprise a component that generates a delay for transmitting the signal, where the delay is a function of the received strength of the signal request. The mobile device can be a cellular phone, a smartphone, a handheld communication device, a handheld computing device, a satellite radio, a global positioning system, a laptop and a PDA.

Yet another aspect sets forth a mobile device that can comprise a component that sends a signal request and a component that receives at least one signal in response to the signal request and a component that selects an access point based at least in part upon received signal. Selection of the access point can be based upon the strength of the at least one signal or time at which the at least one signal was received. The mobile device can be a cellular phone, a smartphone, a handheld communication device, a handheld computing device, a satellite radio, a global positioning system, a laptop and a PDA.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
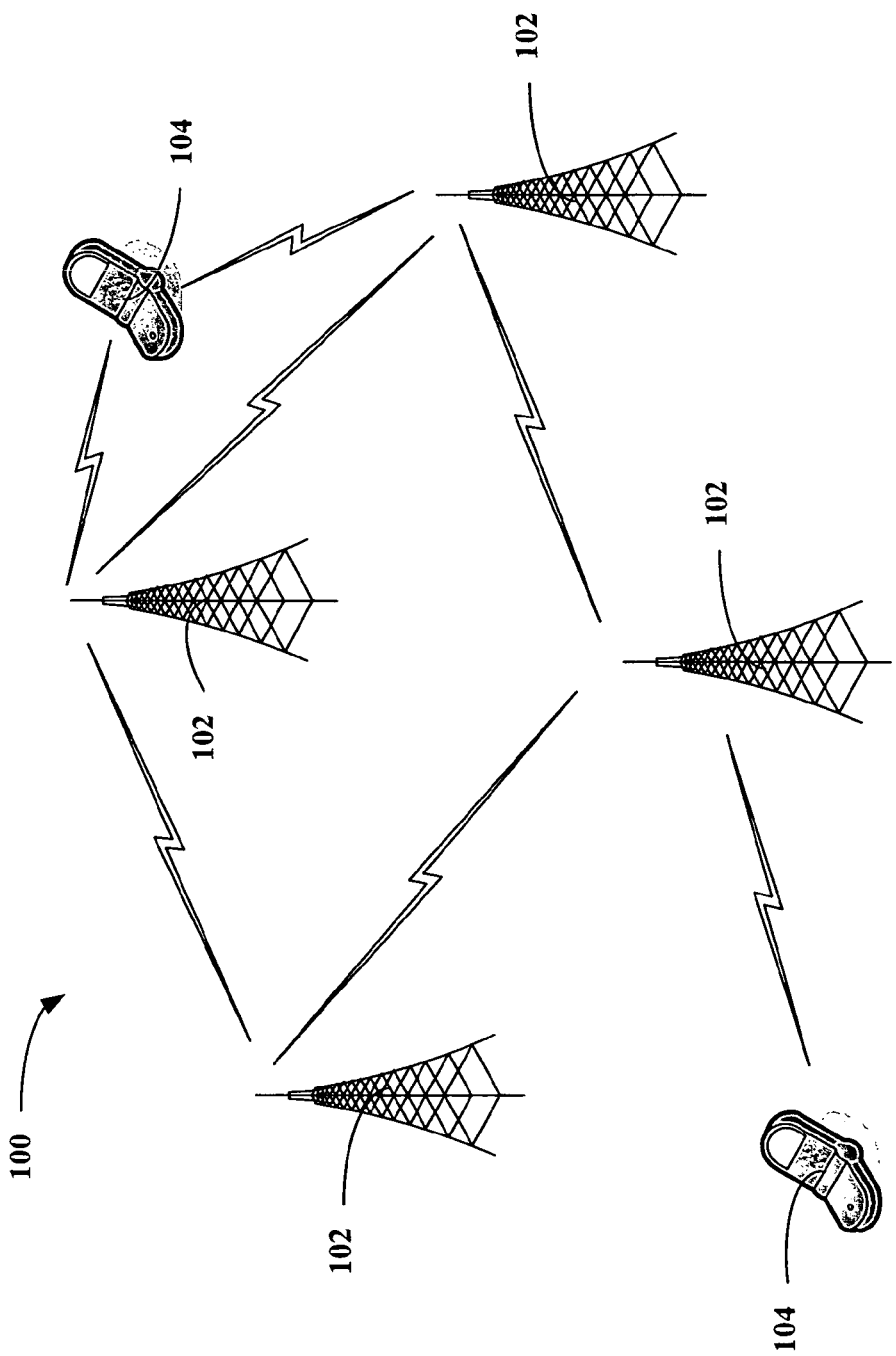
FIG. 1 is an illustration of a wireless communication system according to one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a user device. A user device can also be called a system, a subscriber unit, subscriber station, mobile station, mobile device, remote station, access point, base station, remote terminal, access terminal, user terminal, terminal, user agent, or user equipment (UE). A user device can be a cellular telephone, a cordless telephone, a Session Initiation Protocol (SIP) phone, a wireless local loop (WLL) station, a PDA, a handheld communications or computing device having wireless connection capability, a smartphone, a satellite radio, a global position system, a laptop, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

The methods and system described herein can be used to identify suitable access points and to mitigate signal pollution. In general, access points continuously or frequently transmit acquisition pilots. As used herein, a pilot is a signal used for control, synchronization or reference purposes. The terms pilot and acquisition pilot are used interchangeably herein. The frequent transmission of pilots allows user devices to receive acquisition pilots and access the wireless system with minimal delays. However, the continuous or frequent transmission of pilots by multiple access points can cause signal pollution and reduce system capacity. The impact of signal pollution can be greater in a wireless mesh network with relatively few user devices for each access point. Such networks can include large numbers of access points transmitting pilots while the pilots may be utilized infrequently due to the relatively small number of user devices.

To eliminate or reduce the need to transmit acquisition pilots continuously or frequently, user devices can trigger the transmission of signals that can be used to select an access point by transmitting a request for a signal. Signals or transmissions that can be used to select an access point include, but are not limited to, pilot signals, data packets, broadcast or unicast overhead messages, proposed assignment or connection requests or any other on-demand message. User devices can initiate contact with wireless systems by transmitting a request for signals. Any access points that receive the request from the user device can respond by transmitting signals. Access points can transmit signals for a fixed period of time to limit signal pollution. The user device can receive the signals and select the access point based upon the strongest signal. Consequently, signals used to select access points need be transmitted only during a period of time following a request for a signal from a user device. As a result, the possibility of signal pollution is limited to these limited periods of time.

To further mitigate signal pollution, the response times of access points may be staggered. For example, access points can calculate a delay or back-off period before responding to a signal request. The delay can be based upon the strength of the signal request as received at the access point. In addition, if an access point determines that another access point has already responded before the access point begins transmitting the requested signal, the access point can cancel signal transmission. The cancellation of signal transmission based upon the response of other access points reduces the total number of signals transmitted by access points in the wireless system, while ensuring that the user device is likely to be assigned to the access point with the strongest signal strength. Because the delay or back-off period for each access point is based upon the signal strength of the signal request received at the access point, the access points with the strongest signal should respond to the signal request before access points that have received weak signal requests.

Referring now to FIG. 1, a wireless communication system 100 in accordance with various embodiments presented herein is illustrated. System 100 can comprise one or more access points 102 in one or more sectors that receive, transmit, repeat, etc., wireless communication signals to each other and/or to one or more user devices 104. Each access point 102 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). user devices 104 can be, for example, cellular phones, smart phones, laptops, handheld communication devices, handheld computing devices, satellite radios, global positioning systems, PDAs, and/or any other suitable device for communicating over wireless system 100. In addition, each user device 104 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

Figure 2:
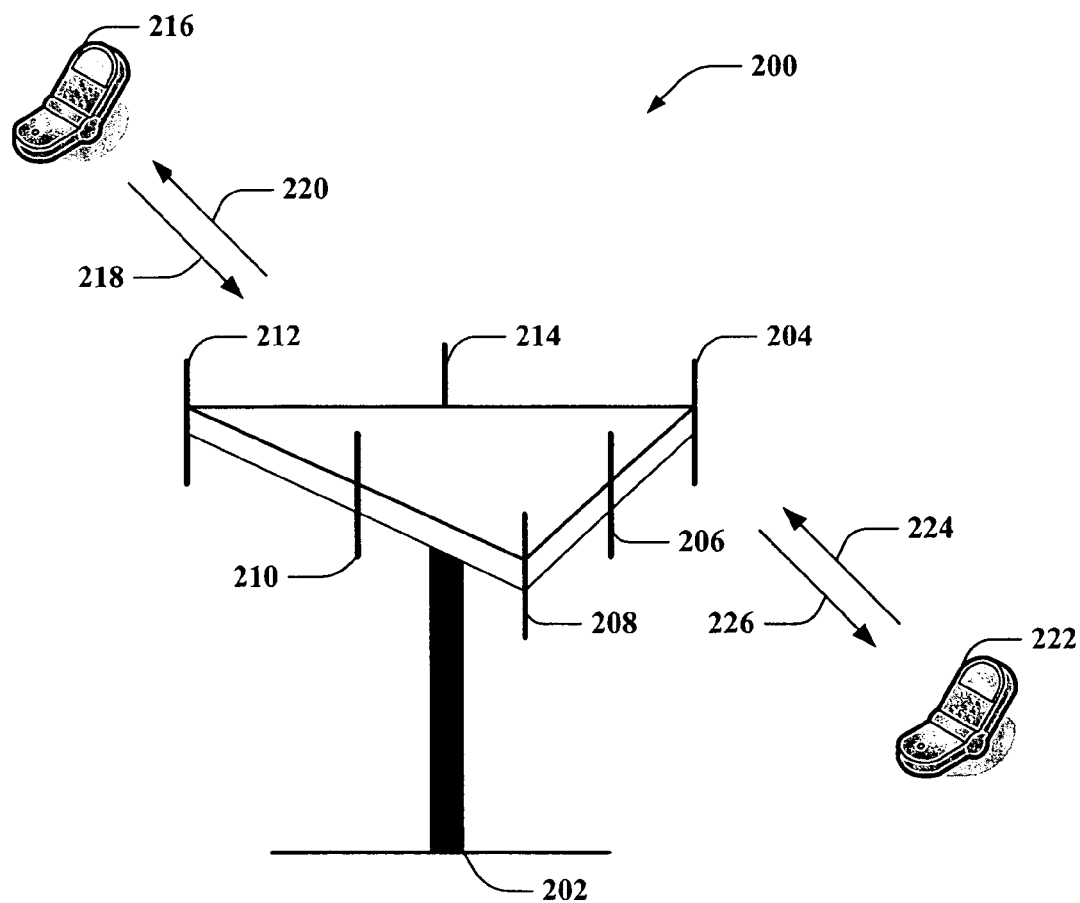
FIG. 2 is an illustration of a wireless communication system according to one or more aspects presented herein.

Referring now to FIG. 2, a multiple access wireless communication system 200 according to one or more embodiments is illustrated. A 3-sector access point 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. User device 216 is in communication with antennas 212 and 214, where antennas 212 and 214 transmit information to user device 216 over forward link 220 and receive information from user device 216 over reverse link 218. Forward link (or downlink) refers to the communication link from the access points to user devices, and the reverse link (or uplink) refers to the communication link from user devices to the access points. User device 222 is in communication with antennas 204 and 206, where antennas 204 and 206 transmit information to user device 222 over forward link 226 and receive information from user device 222 over reverse link 224.

Each group of antennas and/or the area in which they are designated to communicate may be referred to as a sector of access point 202. In one or more embodiments, antenna groups each are designed to communicate to user devices in a sector or the areas covered by access point 202. An access point may be a fixed or mobile station used for communicating with the terminals and may also be referred to as a base station, a Node B, or some other terminology.

A wireless communication system can include one or more access points in contact with one or more user devices. Each access point can provide coverage for a plurality of sectors.

The coverage areas of the access points can overlap, such that a user device can be located within the coverage area of multiple access points.

Typically, when a user device is within the coverage area provided by multiple access points, an access point is selected based upon the signal strength of the pilot or signal transmission from the access point to the user device. The signal strength can be measured in terms of the radio frequency (RF) path loss, where the path loss is the power loss that occurs when radio waves move through space along a specific path. In order to determine the path loss, all access points within the network can transmit signals at a predetermined power. The user device can then measure the power of each of the received signals to determine the access point with the strongest signal strength. Alternatively, the signals can be transmitted at an undetermined power and the transmit power can be encoded in the signal or in another channel. The user device can then compare the difference between the transmitted and received powers to determine the access point with the strongest signal strength.

In general, access points transmit pilot signals continuously or periodically. The period between transmissions of pilots can be kept small so that the user devices can connect quickly. However, the frequent transmission of pilots by multiple access points can cause signal pollution, generating overhead and reducing performance of the wireless system.

Referring to FIGS. 3-7, methodologies relating to selection of access points in wireless communication systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 3:
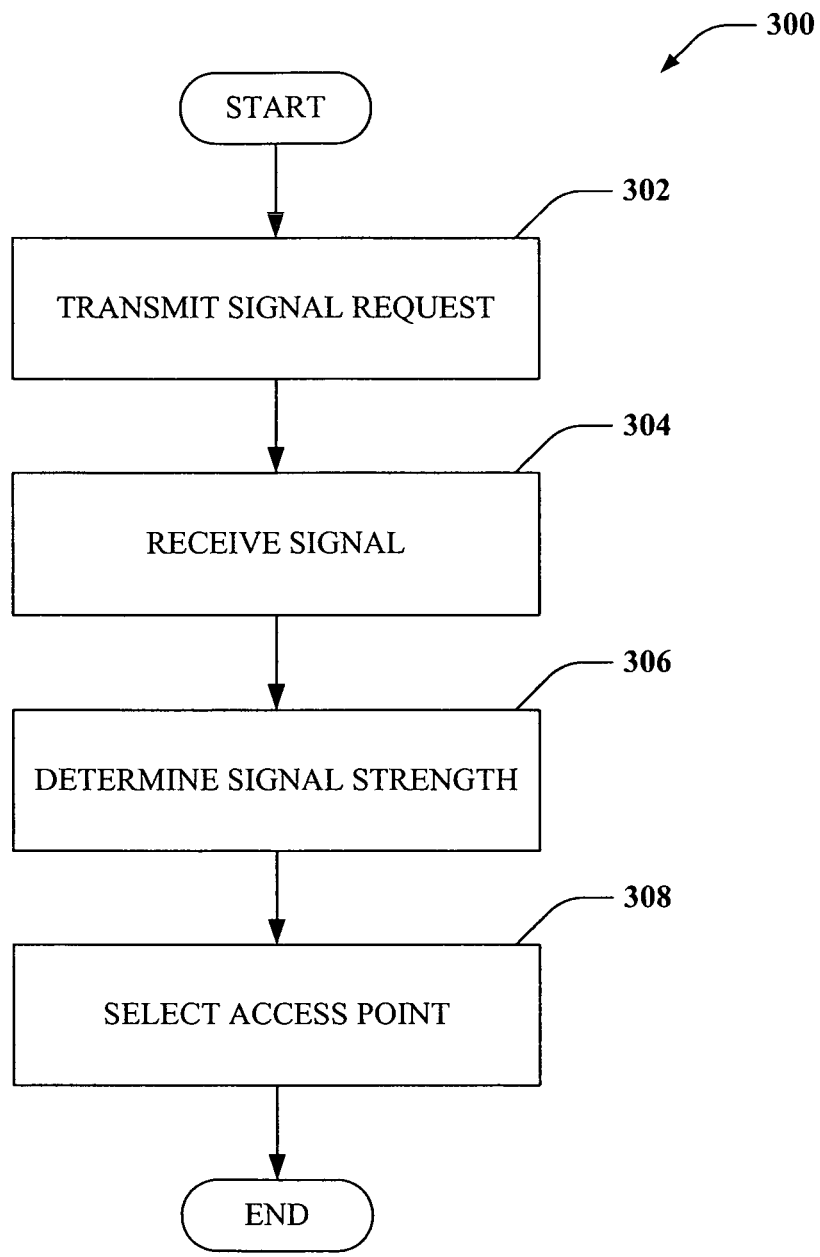
FIG. 3 is an illustration of a methodology for requesting a signal and determining an access point for a user device in accordance with various aspects presented herein.

FIG. 3 illustrates a methodology 300 for requesting a signal and selecting an access point for a user device. At 302, a request for a signal is transmitted. One or more signals can be received in response to the request for a signal at 304. Each of the signals can be transmitted at the same, predetermined power. Alternatively, the transmit power can be undetermined and the transmit power can be encoded in the signal or another channel. At 306, the received strength of each signal can be determined. For example, the RF path loss for each signal can be measured. The access point can be selected based upon the received strength of the signal at 308.

Figure 4:
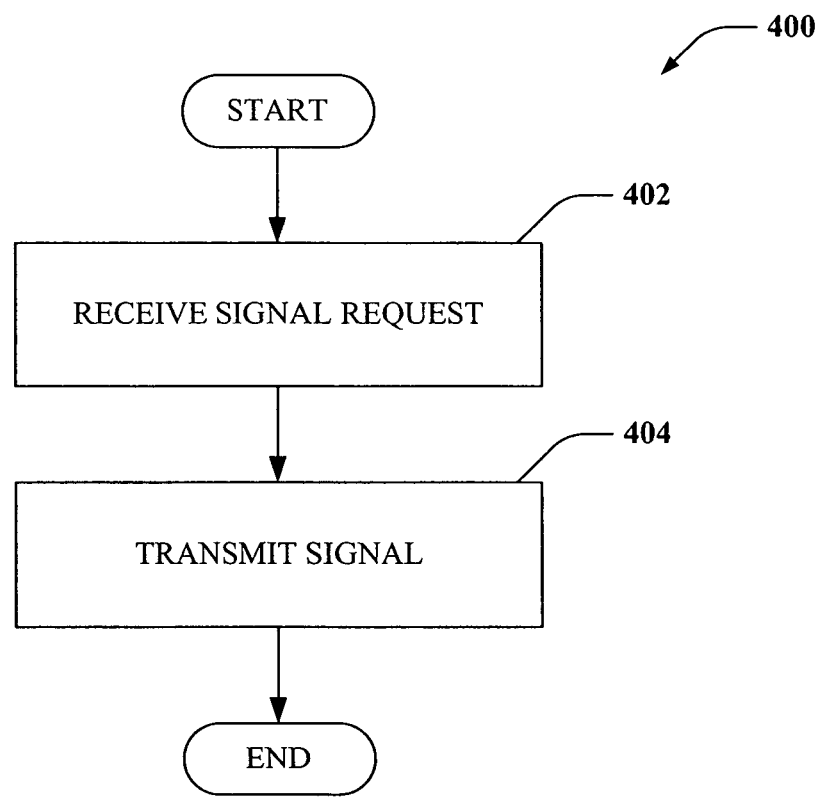
FIG. 4 is an illustration of a methodology for responding to a request for a signal to determine an access point for a user device in accordance with various aspects presented herein.

Referring now to FIG. 4, a methodology 400 for responding to a request for a signal used in the determination of an access point for a user device in accordance with an aspect described herein is illustrated. At 402, a request for a signal is received. A signal can be transmitted in response to the received request at 404. The signal can be transmitted for a limited period of time following the receipt of the request.

In addition, the transmission of a signal in response to a signal request can be delayed to further mitigate signal pollution. An access point can generate a delay based upon the received signal strength of the signal request. The delay can be generated using a monotonically decreasing function of the received strength of the signal request. Consequently, the stronger the received signal, the shorter the generated delay and the sooner the access point will respond to the user device request. To select the access point that is likely to have the strongest signal, the user device can select the first access point to respond. Alternatively, the user device can select an access point from the first several access points to respond to the signal request.

An access point can also elect not to respond to a signal request in order to promote load balancing. Access point load can be based upon the number of user devices assigned to the access point. In order to promote even distribution of user devices across available access points, an access point may refrain from responding to the signal request if it has a high access point load. For example, the access point can determine the access point load and if the load is greater than a predetermined threshold, the access point can refrain from sending signals.

Figure 5:
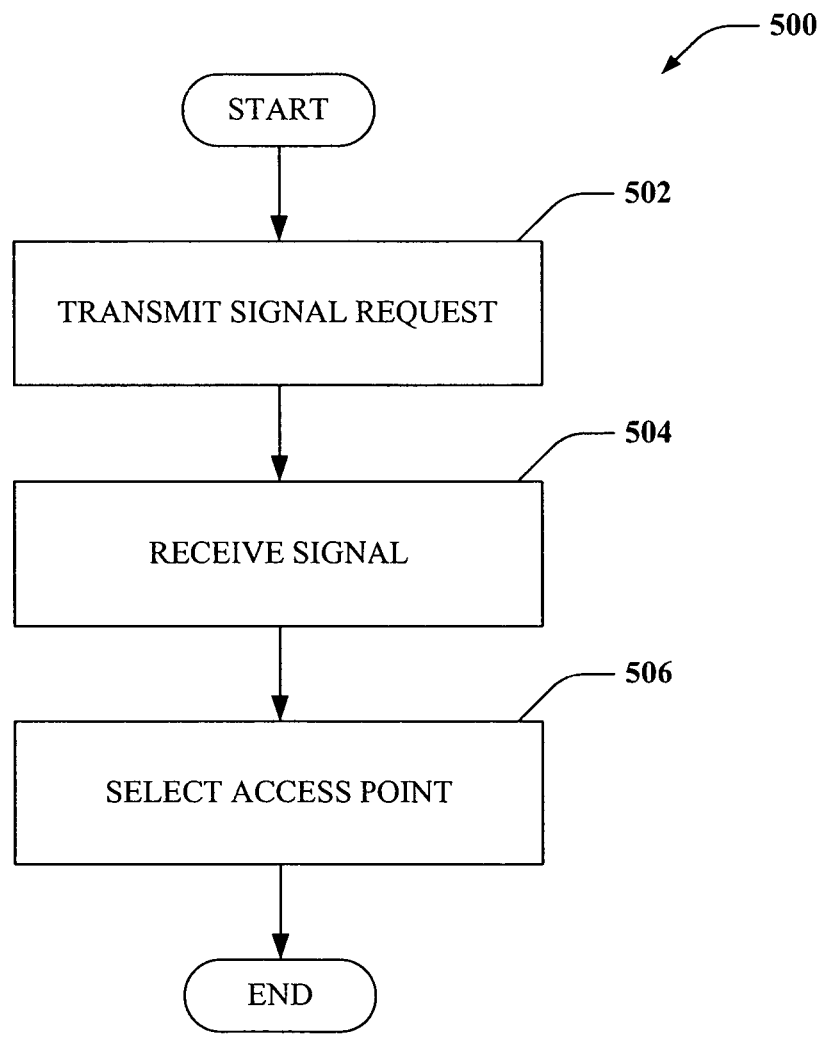
FIG. 5 is an illustration of a methodology for requesting a signal and determining an access point for a user device in accordance with various aspects presented herein.

Referring now to FIG. 5, a methodology 500 for requesting a signal to determine the access point for a user device in accordance with an aspect described herein is illustrated. At 502, a request for a signal is transmitted. One or more signals can be received in response to the request for a signal at 504. The access point can be selected based upon the time or the order of the received signals at 506. For example, the access point that transmitted the first signal received can be selected. Alternatively, the access point can be selected from among the first few access points to respond to the signal request.

Figure 6:
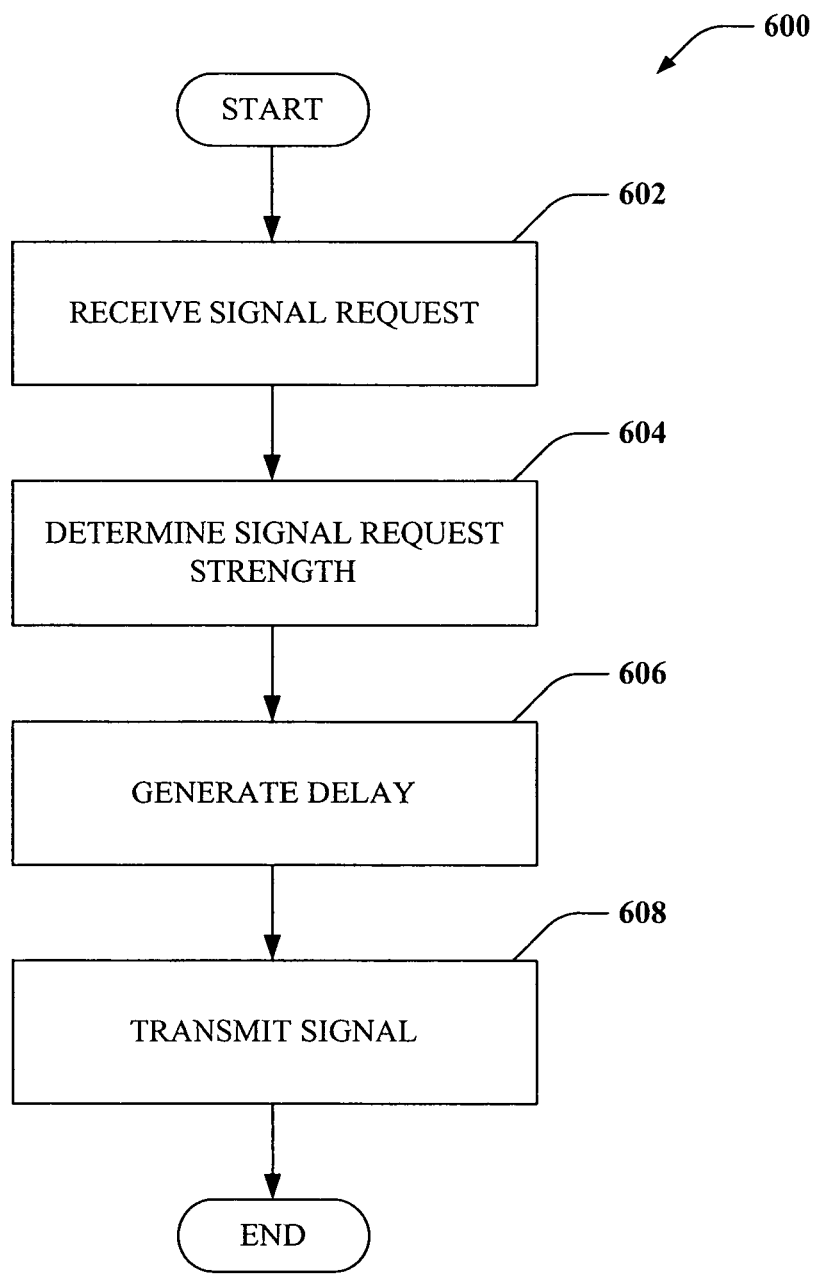
FIG. 6 is an illustration of a methodology for responding to a request for a signal to determine an access point for a user device in accordance with various aspects presented herein.

Referring now to FIG. 6, a methodology 600 for responding to a request for a signal to be used in the determination of an access point for a user device in accordance with an aspect described herein is illustrated. At 602, a signal request is received. The strength of the signal request can be determined at 604. A delay can be generated based upon the strength of the received signal request at 606. The delay can be inversely proportional to the strength of the signal request, such that the signal transmitted by the access point with the best signal strength is likely to be the first signal received at a user device. For example, an exponential function of the negative inverse of the signal request strength, represented herein as PAR, could be used to generate the delay (e.g., exp(−PAR)). Alternatively, the delay could be generated based upon a reciprocal of the signal request strength (e.g., 1/PAR). The delay could be based upon any function that increases as the signal request power decreases (e.g., max(−aPAR+b, 0), where a and b are constants). At 608, the signal can be transmitted after the calculated delay. In addition, if the access point is mobile, the delay can be adjusted based upon the velocity of the access point relative to the user device.

In another aspect, a set of delays can be generated and stored in memory. For example, delay values corresponding to various levels of signal strength can be stored in a lookup table. The appropriate delay can be retrieved from the lookup table based upon the received signal strength.

Figure 7:
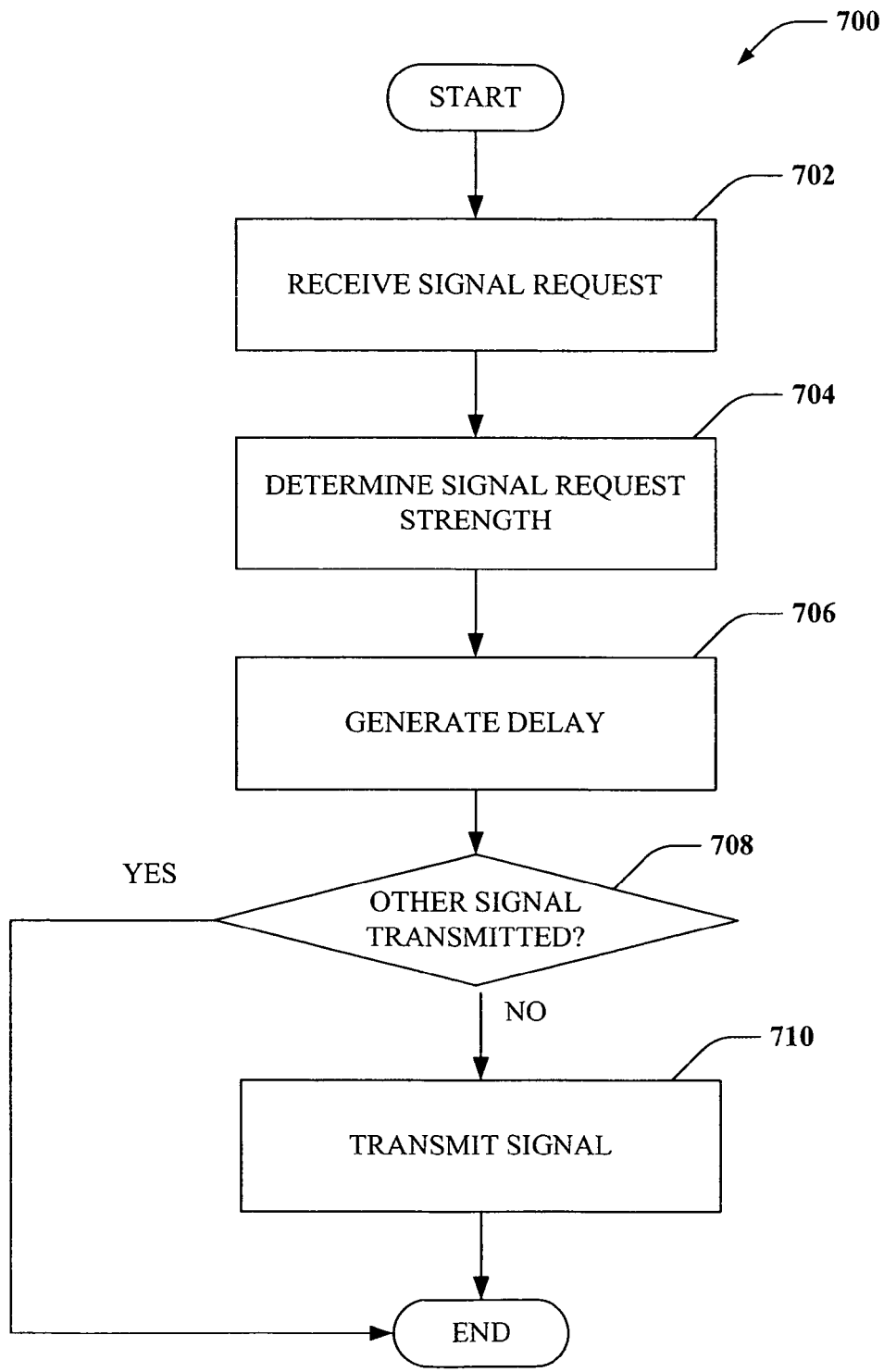
FIG. 7 is an illustration of a methodology for responding to a request for a signal to determine an access point for a user device in accordance with various aspects presented herein.

Referring now to FIG. 7, a methodology 700 for responding to a request for a signal to be used in the determination of an access point for a user device in accordance with an aspect described herein is illustrated. At 702, a signal request is received. The strength of the signal request can be determined at 704. A delay can be generated based at least in part upon the strength of the received signal request at 706. The delay can be inversely proportional to the strength of the signal. For example, any of the functions described above with respect to FIG. 6 can be used to generate the delay. In addition, the delay could also be based in part upon the access point load. For example, if a large number of user devices are assigned the delay can be increased to promote even distribution of user devices. At 708, it can be determined whether other access points have transmitted a signal in response to the signal request. If no, the signal can be transmitted after the generated delay at 710. If yes, the access point does not respond to the signal request and the process terminates.

Alternatively, it can be determined whether a predetermined number of signals from other access points have been determined. If more than the predetermined number of access points have responded, the access point can refrain from sending a signal. Otherwise, the access point can respond by transmitting a signal. Consequently, the user device will receive signals from one or more access points, but not more than the predetermined number of access points, thereby limiting the signals transmitted in response to the request. The user device can select the access point from the set of access points that respond to the request based upon the signal strength of the received signals, the order of response of the access points or a combination thereof.

In addition, an access point can choose not to respond to a signal request to promote load balancing. In order to promote even distribution of user devices across available access points, an access point may refrain from responding to the signal request if it has a high access point load. The access point can compare the load to a predetermined threshold to determine whether to transmit a signal. Alternatively, the access point can determine whether to respond based upon a combination of the number of other access points that have responded and the load of the access point.

The apparatuses and methods described herein can be utilized in networks that include either fixed or mobile access points. In particular, the systems and methods can be utilized in a peer-to-peer networking environment, where user devices can also act as access points, to mitigate signal pollution and decrease overhead. Use of signal requests to initiate signal transmission can be particularly effective in such crowded environments.

It will be appreciated that, in accordance with one or more embodiments described herein, inferences can be made regarding transmission formats, frequencies, etc. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding the function used to generate a delay or back-off period delay or the assignment of a user device to an alternate access point. For example, it can be determined that the user device has left the region covered by a first access point and entered a region covered by a second access point and therefore, the user device should be reassigned to the second access point. It will be appreciated that the foregoing examples are illustrative in nature and are not intended to limit the number of inferences that can be made or the manner in which such inferences are made in conjunction with the various embodiments and /or methods described herein.

Figure 8:
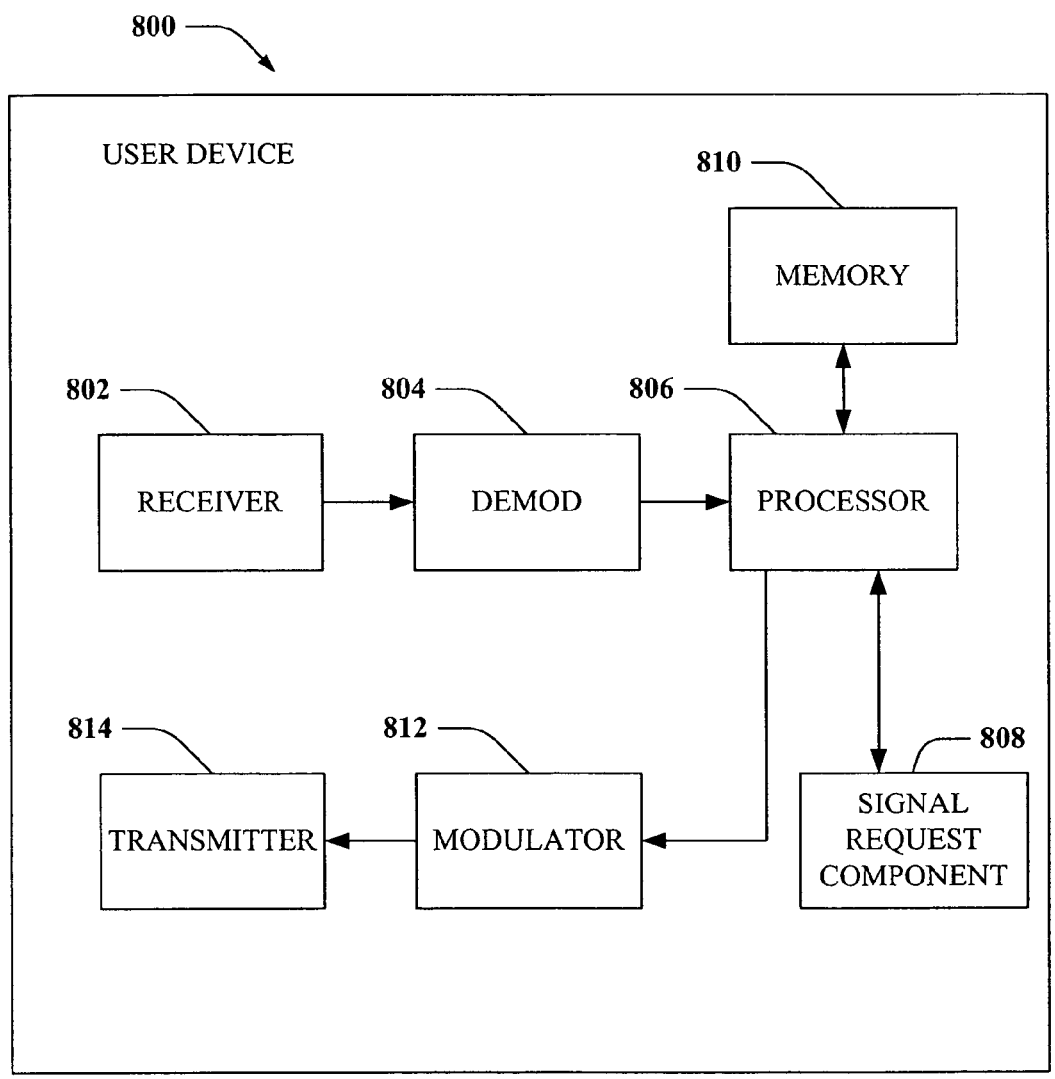
FIG. 8 is an illustration of a system that generates signal requests in a wireless communication environment in accordance with various aspects presented herein.

FIG. 8 is an illustration of a system 800 that generates signal requests in a wireless communication environment in accordance with one or more aspects set forth herein. System 800 can reside in an access point and/or in a user device, as will be appreciated by one skilled in the art. System 800 comprises a receiver 802 that receives a signal and from, for instance one or more receive antennas, and performs typical actions thereon (e.g., filters, amplifies, downconverts, etc.) the received signal and digitizes the conditioned signal to obtain samples. A demodulator 804 can demodulate and provide received pilot symbols to a processor 806 for channel estimation.

Processor 806 can be a processor dedicated to analyzing information received by receiver component 802 and/or generating information for transmission by a transmitter 814. Processor 806 can be a processor that controls one or more components of user device 800, and/or a processor that analyzes information received by receiver 802, generates information for transmission by a transmitter 814, and controls one or more components of user device 800. Processor 806 can utilize any of the methodologies described herein, including those described with respect to FIGS. 3-7, to coordinate communications. In addition, user device 800 can include a signal request component 808 that generates a signal request and evaluates signals received in response to a signal request to select an access point. Signal request component 808 may be incorporated into the processor 806. It is to be appreciated that signal request component 808 can include selection code that performs utility based analysis in connection with selecting access points. The selection code can utilize artificial intelligence based methods in connection with performing inference and/or probabilistic determinations and/or statistical-based determinations in connection with optimizing access point selection.

User device 800 can additionally comprise memory 810 that is operatively coupled to processor 806 and that can store information related to signal requests, methods for determining signal strength, lookup tables comprising information related thereto, and any other suitable information related to access point selection as described herein. Memory 810 can additionally store protocols associated with generating lookup tables, etc., such that user device 800 can employ stored protocols and/or algorithms to select an access point. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory. The processor 806 is connected to a symbol modulator 812 and transmitter 814 that transmits the modulated signal.

Figure 9:
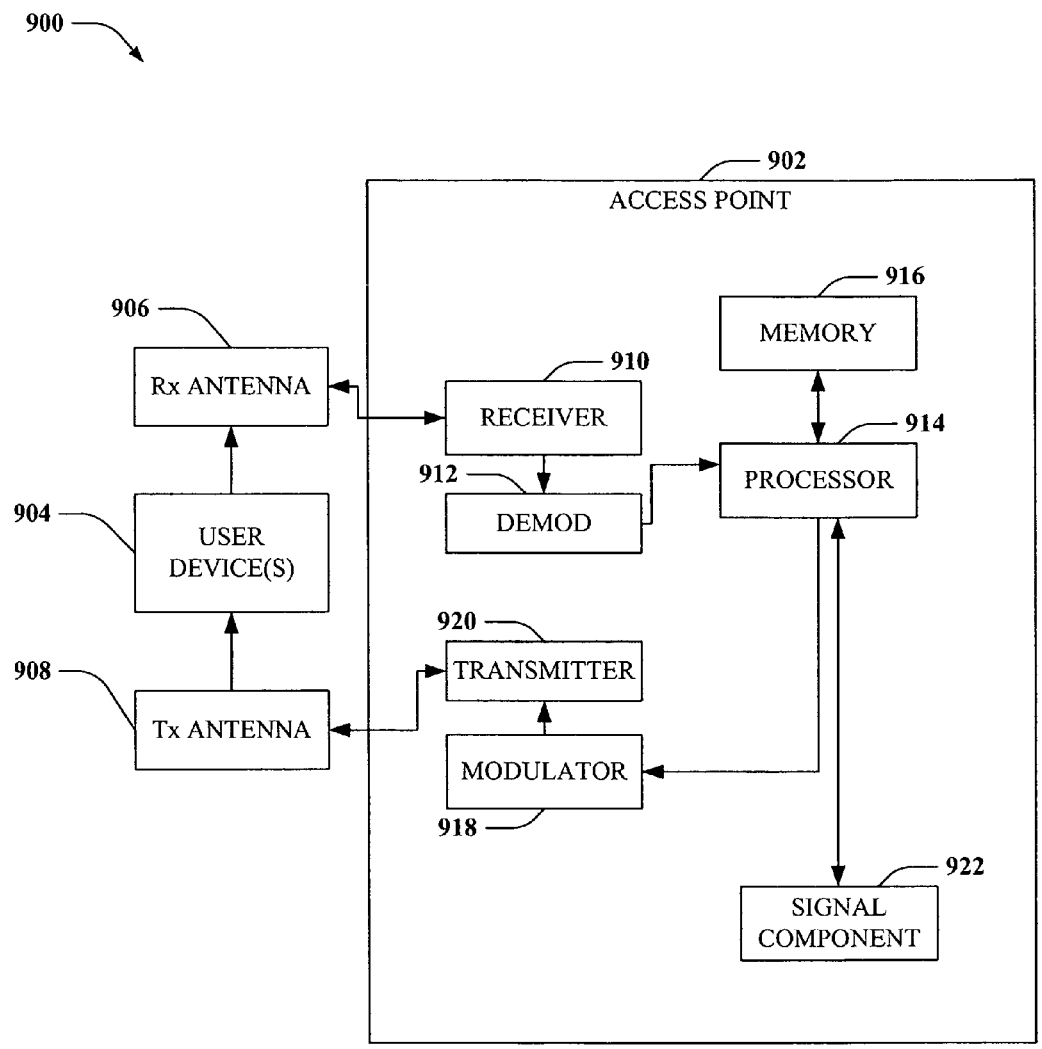
FIG. 9 is an illustration of a system that responds to signal requests in a wireless communication environment in accordance with various aspects presented herein.

FIG. 9 is an illustration of a system 900 that facilitates access point selection in a communication environment in accordance with various embodiments. System 900 comprises an access point 902 with a receiver 910 that receives signal(s) from one or more user devices 904 through one or more receive antennas 906, and transmits to the one or more user devices 904 through a plurality of transmit antennas 908.

In one or more embodiments, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable, receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 914 that is similar to the processor described above with regard to FIG. 8, and is coupled to a memory 916 that stores information related to a broadcast period for signals, user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Access point 902 further comprises a signal component 922, which can be a processor distinct from or integral to processor 914. Signal component 922 can evaluate a received signal request and determine a delay prior to transmission of the requested signal. In addition, signal component 922 can determine if one or more other access points have responded to the signal request, and if sufficient responses have been generated, signal component 922 can cancel or refrain from transmitting a signal response.

Figure 10:
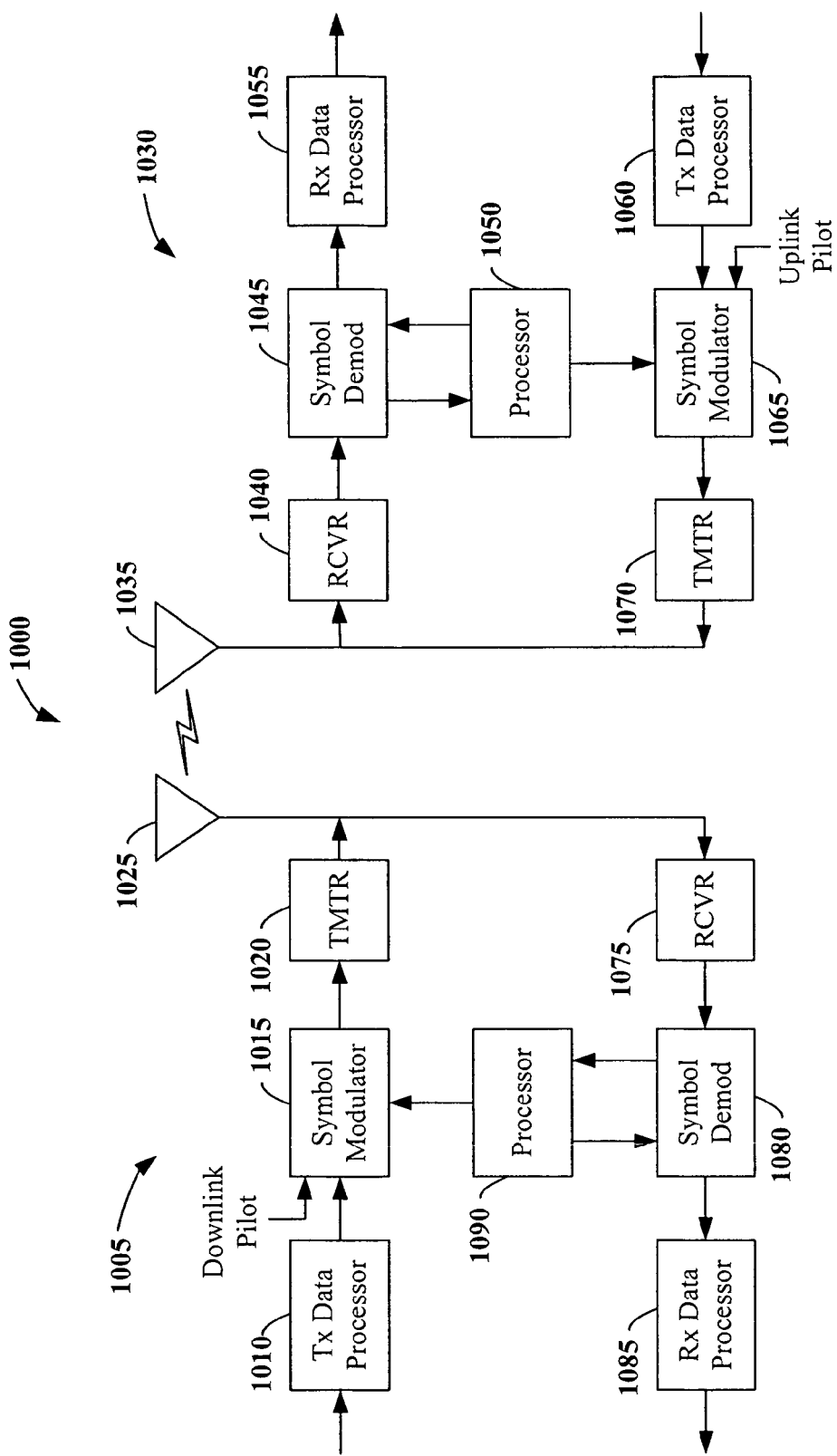
FIG. 10 is an illustration of a wireless communication environment that can be employed in conjunction with the various systems and methods described herein.

FIG. 10 shows an exemplary wireless communication system 1000. The wireless communication system 1000 depicts one access point and one user device for sake of brevity. However, it is to be appreciated that the system can include more than one access point and/or more than one user device, wherein additional access points and/or user devices can be substantially similar or different from the exemplary access point and user device described below. In addition, it is to be appreciated that the access point and/or the user device can employ the systems (FIGS. 8-9 and 11-12) and/or methods (FIGS. 3-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. Symbol modulator 1015 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. Alternatively, pilot symbol transmission can be triggered by a request from a user device. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the user devices. At user device 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation and CQI calculations. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from user device 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by user device 1030. Multiple user devices may transmit pilots concurrently on the uplink on their respective assigned sets of pilot subbands, where the pilot subband sets may be interlaced.

Processors 1090 and 1050 direct (e.g., control, coordinate, manage, etc.) operation at access point 1005 and user device 1030, respectively. Respective processors 1090 and 1050 can be associated with memory units (not shown) that store program codes and data. Respective processors 1090 and 1050 can also perform computations to derive frequency and impulse response estimates for the uplink and downlink, respectively.

The techniques described herein may be implemented by various means. For example, these techniques may be implemented in hardware, software, or a combination thereof. For a hardware implementation, the processing units used for access point identification may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor by various means as is known in the art.

Figure 11:
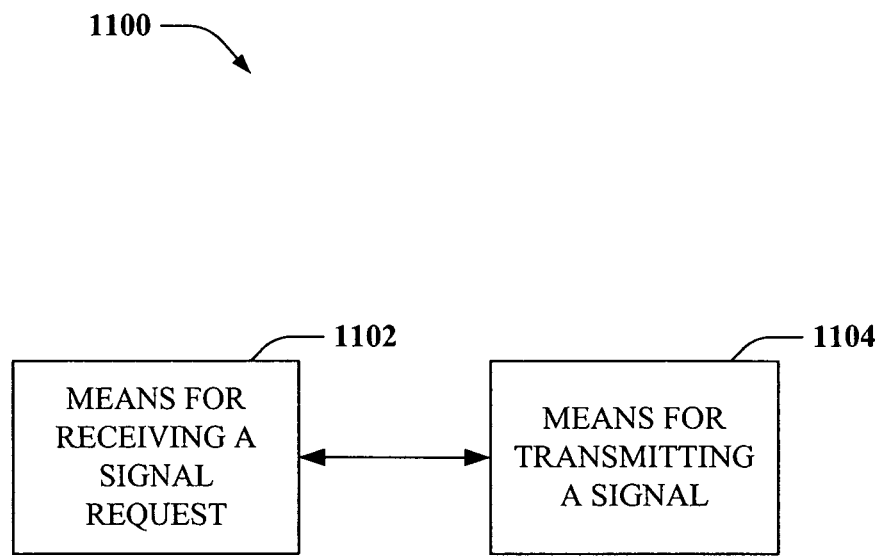
FIG. 11 is an illustration of an apparatus that facilitates identifying access points in accordance with various aspects presented herein.

Referring now to FIG. 11, an apparatus 1100 that facilitates identifying access points is illustrated. Apparatus 1100 includes a means for receiving a signal request 1102 and a means for transmitting a signal in response to the signal request 1104. An access point can be identified or selected based upon the signal transmitted by means for transmitting a signal in response to the signal request 1104. In addition, apparatus 1100 can calculate a delay or back-off period prior transmitting a signal in response to the signal request.

Figure 12:
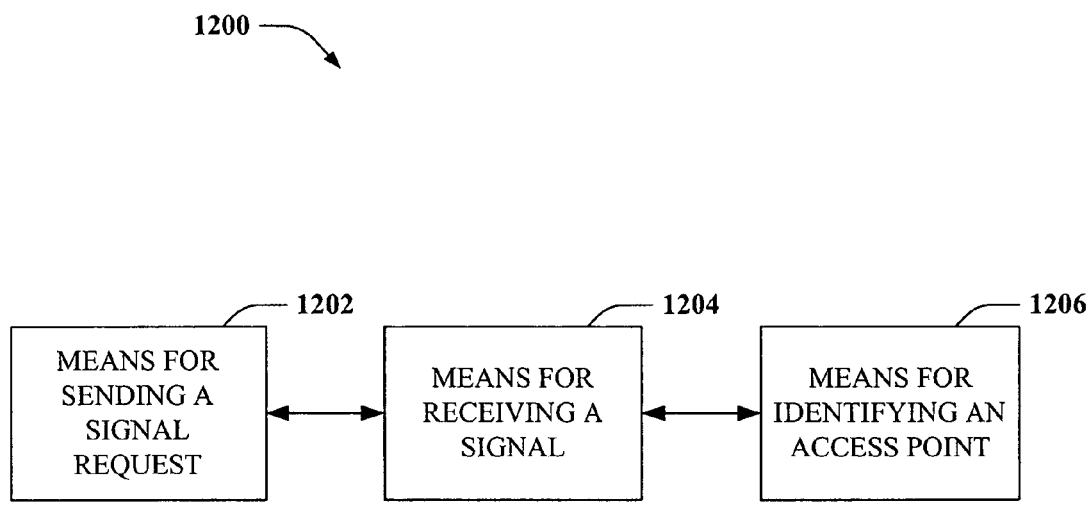
FIG. 12 is an illustration of an apparatus that facilitates identifying access points in accordance with various aspects presented herein.

Referring now to FIG. 12, an apparatus 1200 that facilitates identifying access points is illustrated. Apparatus 1200 includes a means for sending a signal request 1202, a means for receiving a signal in response to the signal request 1204 and a means for identifying an access point 1206. Means for identifying an access point 1206 can select or identify an access point for communication based upon the signals received by means for receiving a signal 1204.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for mitigating multiple access point pilot signal transmissions, comprising:
    receiving at an access point a signal request, wherein the signal request is a request from an apparatus for a pilot signal;
    generating, in response to receiving the signal request, a delay, wherein the delay is based, at least in part, on the received signal strength of the signal request;
    determining whether other access points respond to the signal request during the delay, and upon the determining indicating that no other access point responded to the signal request during the delay, transmitting the pilot signal, via a wireless link.

2. The method of claim 1, wherein transmitting the pilot signal comprises transmitting the pilot signal for a limited period of time.

3. The method of claim 1, wherein the delay varies inversely with the received signal strength of the signal request.

4. The method of claim 1, wherein the function is related to exp(-PAR), wherein PAR is the received signal strength of the signal request.

5. The method of claim 1, further comprising storing a set of delay values that correspond to various received signal strengths, wherein generating the delay further comprises retrieving a delay value from the set of delay values based at least in part upon the received signal strength of the signal request.

6. The method of claim 1, further comprising: upon the determining indicating that not more than a predetermined number of other access points responded to the signal request during the delay, transmitting the pilot signal, via the wireless link.

7. The method of claim 1, further comprising: determining an access point load, wherein the delay is further based, at least in part, on the determined access point load.

8. An apparatus for mitigating multiple access point pilot signal transmissions, comprising:
    a receiver adapted to receive a signal request, wherein the signal request is a request from an apparatus for a pilot signal;
    a processor, coupled to the receiver; and
    a transmitter coupled to the processor, and configured to selectively transmit a pilot signal,
    wherein the processor is configured to
        generate, in response to receiving the signal request, a delay, wherein the delay is based at least in part upon the received strength of the signal request,
        determine whether other access points respond to the signal request during the delay, and
        control the transmitter to send the pilot signal, upon the determining indicating that no other access point responded to the signal request during the delay, via a wireless link, to the apparatus.

9. The apparatus of claim 8, further comprising: a memory coupled to the processor, wherein the memory stores a set of delay period values, and wherein the processor generates the delay by selecting from the set of delay period values, based on the received signal strength of the signal request.

10. The apparatus of claim 8, wherein the processor is further configured to determine whether not more than a predetermined number of other access points respond to the signal request during the delay period and, upon determining that not more than the predetermined number of other access points responded to the signal request during the delay, to control the transmitter to transmit the pilot signal.

11. The apparatus of claim 8, wherein the processor is further configured to determine an access point load and to generate the delay further based, at least in part, on the determined access point load.

12. An apparatus for mitigating multiple access point pilot signal transmissions, comprising:
    means for receiving a signal request, wherein the signal request is a request from an apparatus for a pilot signal;
    means for generating, in response to receiving the signal request, a delay, wherein the delay is based, at least in part, on the received strength of the signal request;
    means for determining whether other access points respond to the signal request during the delay; and
    means for transmitting the pilot signal, via a wireless link, upon the determining indicating that no other access point responded to the signal request during the delay.

13. The apparatus of claim 12, further comprising: memory for storing a set of delay values that correspond to various received signal strengths, and wherein the means for generating the delay is configured to retrieve a delay value from the set of delay values based at least in part upon the received signal strength of the signal request.

14. The apparatus of claim 12, further comprising: means for determining an access point load, wherein the delay is further based, at least in part, on the determined access point load.

15. A computer-readable non-transitory medium encoded with instructions that, when executed by a processor, cause the processor to perform a method for mitigating multiple access point pilot signal transmissions, wherein the instructions include instructions that, when executed by the processor, cause the processor to:
    receive a signal request, wherein the signal request is a request from an apparatus for a pilot signal;
    generate a delay, in response to receiving the signal request, wherein the delay is based, at least in part, on the received strength of the signal request;
    determine whether other access points respond to the signal request during the delay; and and
control a transmitter to transmit the pilot signal, via a wireless link upon the determining indicating that no other access point responded to the signal request during the delay.

16. The computer-readable non-transitory medium of claim 15, further comprising instructions that, when executed by a processor, cause the processor to store NN for: storing a set of delay values that correspond to various signal strength levels; and retrieve a delay value from the set of delay values based at least in part upon the received strength of the signal request.

17. The computer-readable non-transitory medium of claim 15, further comprising instructions that, when executed by a processor, cause the processor to determine an access point load, wherein the delay is further based, at least in part, on the determined access point load.

18. The apparatus of claim 12, wherein the means for transmitting the pilot signal is further configured to transmit the pilot signal, via the wireless link, upon the determining performed by the means for determining indicating that not more than a predetermined number of other access points responded to the signal request during the delay.

19. The computer-readable non-transitory medium of claim 15, further comprising instructions that, when executed by the processor, cause the processor to transmit the pilot signal, via the wireless link, upon the determining indicating that not more than a predetermined number of other access points responded to the signal request during the delay.

* * * * *